Patented Jan. 26, 1954

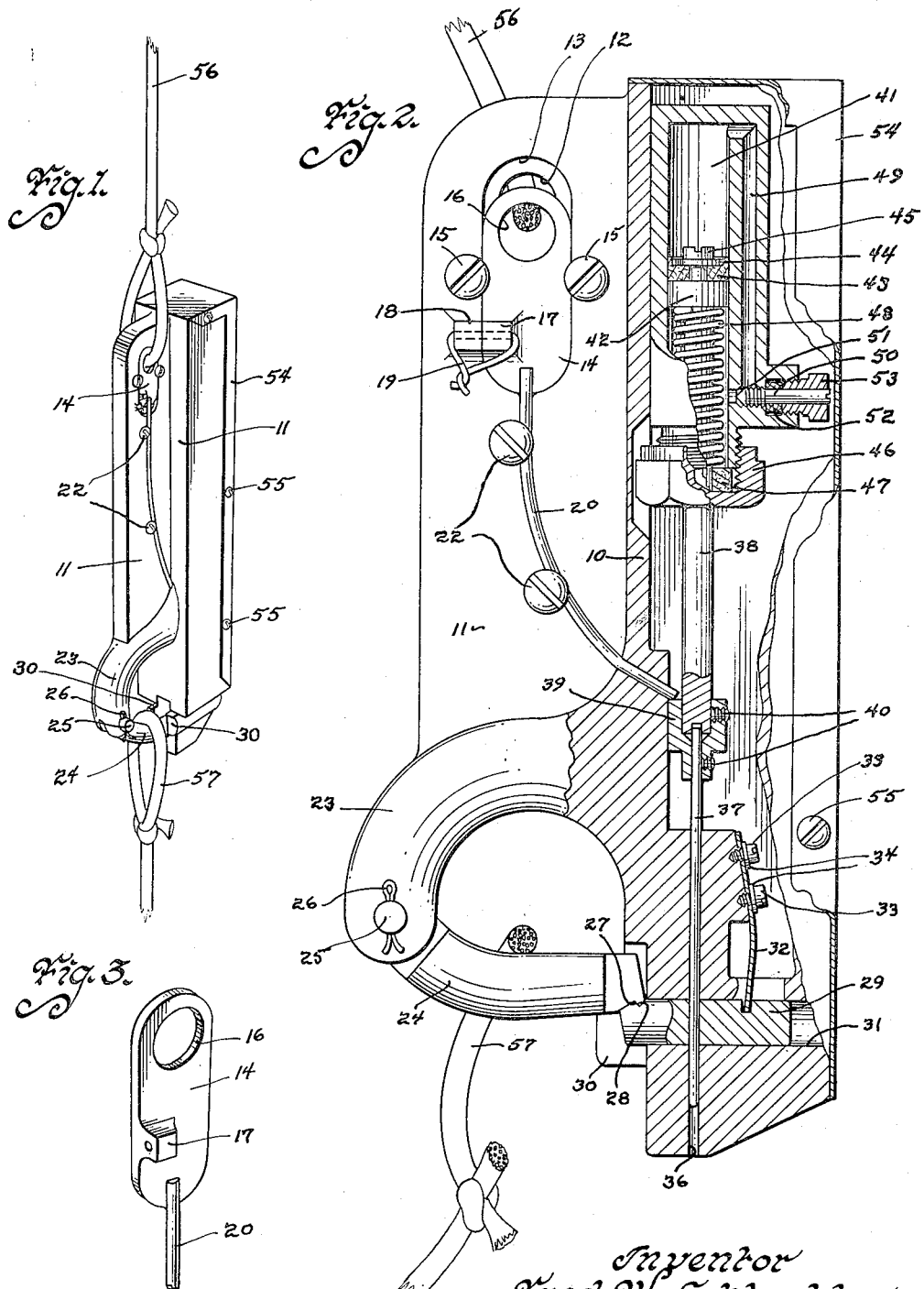

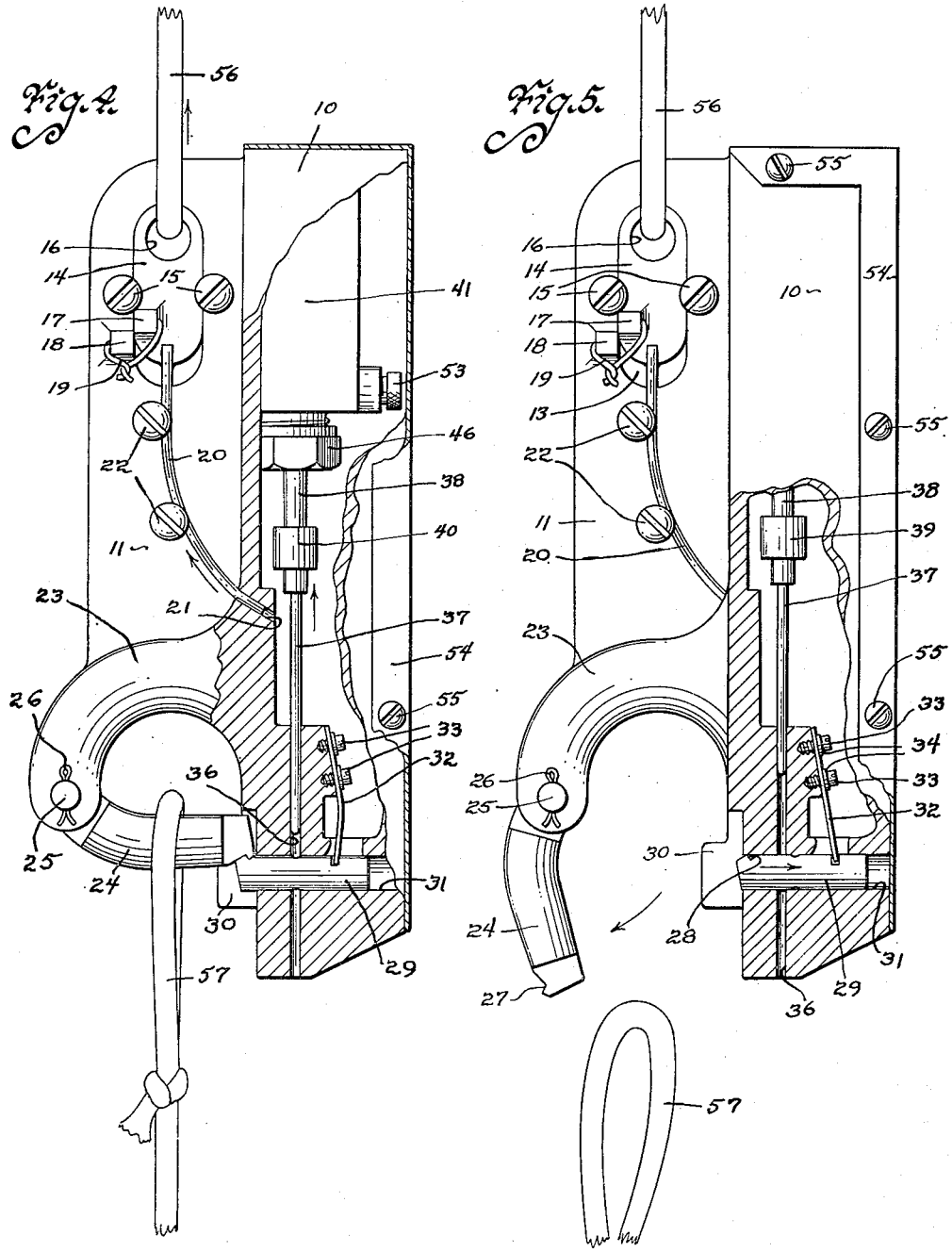

2,667,376

UNITED STATES PATENT OFFICE 2,667,376

PARACHUTE QUICK RELEASE COUPLING

Fred W. Schlachter, Rockwell City, Iowa

Application July 21, 1950, Serial No. 175,036

5 Claims. (Cl. 294—83)

My device relates to the art of quick release couplings to hold a load weight to a pulling force until a propitious moment and then instantly disconnecting the load from the supporting or pulling force.

It has been a common practice for a number of years and one that is daily becoming more common, to drop loads from aircraft by parachute to isolated spots. This technique has been used to drop supplies to combat disease and famine in areas where other means of transport are poor. It has also been a common practice in time of flood and other disaster when normal transportation means are interrupted to take medicine and food into disaster areas by means of aircraft and dropping the same by parachute. A common war-time practice is to drop both troops and supplies by parachute behind enemy lines or to supply isolated garrisons in the same manner. Dropping supplies by parachute has been exploited to advantage also in air-sea rescue work. This type of rescue work sometimes requires dropping relatively large boats at times where several parachutes may be used on a single burden. Parachutes are also commonly used to return scientific apparatus from sub-stratospheric balloon flights made to investigate the composition of the sub-stratosphere and conditions existing in the sub-stratosphere.

All of these operations have experienced certain difficulty in using the parachute to drop their supplies. This difficulty stems primarily from the fact that the parachute and the item are positively secured to each other. When the item reaches the ground or surface of the sea as the case may be, the load remains secured to the shroud lines and therefore continues to resist the pull of ground winds in the parachute canopy. In many instances, therefore, the canopy does not collapse but instead pulls the equipment along the ground which results in two distinct disadvantages. The first of these is the damage to the equipment that may result from its being dragged over rough terrain. This danger is particularly true in regard to medical supplies and delicate scientific apparatus.

A second and much more major difficulty is the fact that the equipment is sometimes moved considerable distances from the point at which it first reaches the surface of the ground or water. One example of the disadvantage of this movement of the equipment over the ground is the attempt to parachute equipment for paratroops or isolated garrisons relatively close to the point desired. The equipment may be moved a considerable distance over the surface of the ground. Unless the "drop" is made to allow for possible ground winds, if that can be known, the equipment may end up in the hands of the enemy rather than in the hands of friendly troops. Even if the equipment is not lost, valuable time is wasted when the troops are required to travel several hundred yards on the ground before they can reach their equipment. In some cases, the delay so occasioned could jeopardize their position. Even greater difficulty has been experienced in dropping craft in air-sea rescue work. Cases have been reported in which boats dropped to survivors of sinking ships or fallen aircraft have been pulled along the surface of the water for several miles with the parachute acting as a sail. On other occasions the pull of the parachute has overturned the boat. In the cases where the larger rescue craft were dropped, capsizing rendered it practically useless. It is almost impossible for even a group of skilled individuals to support themselves in the water and right one of these large rescue craft once it is capsized.

Obviously, there is a need for a means to connect a load to a parachute which will disconnect the parachute from the load as soon as contact with the ground or water is made. Such a device will instantly remove all resistance to any pull exerted by ground winds in the canopy and would therefore permit the canopy to collapse as it does when a person who has landed in a parachute runs with the shroud lines in the direction in which ground winds may be trying to pull the parachute. A coupling that must be controlled is useless for an inanimate burden being parachuted obviously. The unit must operate automatically. Furthermore, a coupling that depends from the beginning entirely on a constant load weight bearing on it to keep it secured is unsatisfactory. There is usually some time lag between the opening of the main canopy and the moment when the burden being parachuted begins to bear on the shroud lines with a constant force. During this time lag there must be a positive coupling of the burden and the parachute shroud lines.

With these difficulties of the prior art in mind, it is the primary object of my invention to provide a quick release coupling designed to be interposed between a pulling force and a load supported or moved by the pulling force and designed to release when the pulling force asserted on the load terminates or is diminished in degree. It is an additional purpose of my invention to provide such a quick release designed to be interposed between a pulling force and a load supported or moved by the pulling force and having a time positive locking device to keep the coupling in a closed position regardless of the force asserted on the coupling during the timed period and after which timed period the device is retained in the coupled position by reason of the pulling force exerted by the weight load.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my quick release coupling with a fragment of the attaching means for a parachute and a load weight illustrating how the coupling is interposed between these two units, Fig. 2 is an enlarged side view of my quick release coupling with a portion of it broken away to illustrate the internal construction of the device. Fragmentary portions of the attaching means for a pulling force and a load weight are also shown, Fig. 3 is an enlarged perspective view of the timing device trigger element with only a fragment of the trigger rod shown, Fig. 4 is an enlarged sideview of my quick release coupling with a portion of the outer structure broken away to illustrate the positions of the various parts when the locking rod has been withdrawn by the timing mechanism. Connections for a pulling force and a load weight are also included to show their relative positions, and Fig. 5 is an enlarged sideview of the device with a fragment of the outer structure broken away to illustrate the position of the parts at the instant when the load weight is released from the parachute or other pulling force.

Referring to the drawings, I have used the numeral 10 to designate the channel frame housing. A fin designated 11 is rigidly secured to the channel frame housing as by welding or any other appropriate manner, or may be formed integrally with the channel frame housing. It is disposed parallel to the housing and extends perpendicularly from the side as shown in all the figures. Fin 11 has an elongated opening designated 12 near its upper end, which opening is near one end of an elongated slideway designated 13. The slideway 13 is somewhat wider than the opening 12 to leave track-like supports at either side of the opening and also at the upper end beyond the opening. Since the opening is somewhat shorter than the slideway, the lower portion of the slideway is solid on the bottom to support a sliding movable trigger element designated 14. Trigger element 14 is held in the slideway by means of the securing screws designated 15 and has a hole 16 near its upper end. On the lower portion of the trigger element is a drilled boss designated 17 which is constructed and arranged to align itself with a similar drilled boss 18 located on the fin when the trigger element is slidably moved to the lower end of the slideway 13. A safety lock wire designated 19 may be inserted through the drills in the bosses 17 and 18 to secure the trigger against accidental movement in handling. A trigger rod designated 20 is rigidly secured to the movable trigger element 14 and extends downwardly and to the right as illustrated in the drawings and through a drill passage designated 21 into the center of the channel frame 10. The trigger rod may be retained in any suitable manner as by the screws 22 or the like, the heads of which prevent any considerable lateral movement of the trigger rod without inhibiting its sliding movement. A clevis support designated 23 may be formed integrally with the channel frame housing 10 or may be rigidly secured thereto as by welding or the like and extends outwardly and downwardly in an arcuate path to a forked end, in which the clevis retaining arm 24 is pivotally secured by the clevis pin 25 and cotter key 26. The clevis arm 24 has a notch designated 27 at its right hand end as viewed in the drawings. This notch matches a complementary notch designated 28 in the clevis trigger element 29. The notched end of clevis retaining arm 24 is held against lateral movement by entering a slotted passage in the channel frame housing, which slotted passage leaves the shoulders 30 on either side of it. The clevis trigger element 29 is slidably mounted in a bored passage 31 in the lower right hand end of the device as view in the illustration. A clevis trigger spring 32 yieldingly urges the clevis trigger to the position shown in Fig. 5. This spring is secured to the housing in any suitable manner as by retaining screws 33 with lock washers 34 insuring their continuing clamping action. The clevis trigger has a drilled hole designated 35 which is so located as to align with a drilled passage designated 36 in the channel frame housing 10 when the device is in the position illustrated by Figs. 2 and 4. The clevis trigger is positively held in this position by locking pin 37 when it is in its forward position as illustrated in Fig. 2. The locking pin is secured to the connecting rod 38 by means of the adapter cap 39 which is held in place by the set screws designated 40. The connecting rod is operatively associated with a hydraulic timing device formed by the cylinder 41 with its piston designated 42 that is sealed against the cylinder walls to prevent passage of hydraulic fluid past seal 43 which may be of any resilient material that is not effected by hydraulic fluid and the flat washer 44, all secured together by cap screw 45. A cylinder cap 46 threadably engages the end of cylinder 41 and by means of appropriate packing 47 permits movement of the connecting rod 38 and at the same time prevents leakage of hydraulic fluid out of the cylinder. A spring designated 48 is interposed between the cylinder cap and the piston and yieldingly urges the piston toward the top of the cylinder as viewed in Fig. 2. All the area within the cylinder on both sides of the piston is filled with hydraulic fluid so that any movement of the piston must displace hydraulic fluid from one side of the piston to the other. The by-pass 49 provides a means for the hydraulic fluid to escape from one side to the other and the rate at which the fluid flows is controlled by a needle valve designated 50 in relation to the valve seat 51. Leakage at the valve is prevented by the packing designated 52 which is held securely in place by packing nut 53. The moving parts within the channel of the channel frame are protected from contaminating dust and dirt by the dust cap designated 54 which may be held in place by any suitable manner as by cap screws 55 or the like.

The operation of my device is most easily understood by commencing with Fig. 2 which is an illustration showing the device in its locked position. It will be noted that trigger element 14 is in its lower position in the slideway 13. A connection designated 56 to the parachute shroud lines is secured through the elongated opening 12 of the fin 11 and also through the opening 16 in the trigger element 14. It will also be noted that the clevis trigger 29 is in its left hand position as viewed in Fig. 2 with its notch 28 engaging the notch 27 of the clevis arm which is in its effective closed position. Lock pin 37 is inserted through the drilled hole in the clevis trigger and the drilled passage in the lower end of the channel frame as shown in Fig. 2. Thus the clevis trigger is positively secured against sliding action. The lock pin 37 is held in its forward locking position against the efforts of spring 48 by the trigger rod 20. The numeral 57 designates a line or securing means for a load weight. The device in this position is as it would be just before a weight load is pushed from the transport aircraft. When the load is dropped and the parachute is opened by the static line, the canopy opens suddenly giving a sharp jerk on the parachute shroud line attaching means 56 which causes trigger element 14 to move to the upper end of the slideway 13, safety 19 being sheared by the sudden jerking movement of the drilled bosses 17 and 18 with respect to each other. This movement of trigger element 14 withdraws trigger rod 20 from the path of the adapter cap 39 as shown in Fig. 4 and the spring 48 begins to move, locking the piston 42 and therefore connecting rod 38 and locking pin 37 in an upwardly direction as shown by the arrow adjacent locking pin in Fig. 4. Since the hydraulic fluid is restricted in its rate of movement from the upper side of the piston 42 through by-pass 49 by the needle valve 50, the withdrawal of the locking pin 37 occupies some little space of time. During this time, the parachute and load weight have an opportunity to stabilize so that the load weight begins to exert a constant even pull on the parachute canopy and therefore on the quick release clevis retaining arm. When the load has thus stabilized to a constant pull, the locking pin is entirely withdrawn as shown in Fig. 4. Clevis retaining arm 24 is then held in its effective closed position by the interlocking of the notches 27 and 28 with each other. As soon as load weight is released from load bearing line 57, however, the slanting complementary faces of the notches 27 and 28 allow spring 32 to move the clevis trigger rearwardly momentarily forcing the clevis arm 24 upwardly a sufficient distance to permit the complete withdrawal of the clevis trigger element 29 and therefore the release of clevis arm 24 as shown in Fig. 5. Thus the instant the load represented by the line 57 ceases to exert a constant resistance against a pulling force represented by the line 26 and my quick reelase coupling instantly disconnects the load and its supporting or pulling force. As used with a parachute for dropping supplies or air-sea rescue equipment, the parachute and its load will be disconnected instantly when the object strikes any surface, either land or water. As soon as the weight load is released, the parachute will collapse. The difficulties and dangers resulting from positively connected parachute loads may be avoided by the use of my quick release, therefore.

To reset the device for additional "drops," it is only necessary to remove dust cap 54 by taking out cap screws 55, inserting a compression means behind adapter cap 39, moving clevis retaining arm 24 to its effective position, depressing clevis trigger 29 to align its drill hole 35 with the drill passage 36 in the channel frame housing and the compressing spring 48 and resetting lock pin 37 in the clevis trigger. With the compression means so holding the hydraulic timing device, the moveable trigger element 14 is returned to its lower position so that trigger rod 20 re-engages adapter cap 39 which re-establishes the original effective starting position of the device. Safety wire 19 may be reinserted through the drilled bosses as shown in Fig. 2 to prevent accidental triggering before a drop is made.

Some changes may be made in the construction and arrangement of my quick release coupling and method of making same without departing from the real spirit and purpose of my invention, and it is my intention to cover by my claims, any modified forms of structure or use of mechanical equivalents which may be reasonably included within their scope.

I claim:

1. In a quick release coupling having a frame and a timed positive lock release mechanism, a pulling shock actuated trigger means for starting the timing cycle of said timed positive lock release mechanism; said trigger means comprising: a slide way in said frame a moveable element having a hole in it constructed and arranged to slideably fit in said slide way, an elongated hole in the lateral center of said slide way and nearer one end of said slide way than the other; a portion of said elongated opening always registering with the hole in said moveable element; and a means for operatively connecting said moveable element to said timed positive lock release mechanism; whereby when said moveable element is at one end of said slide way and a connecting member is inserted through the hole in said moveable element and the opening in said slide way, a pulling shock on said connecting member will pull said moveable element to the other end of said slide way and permit the frame to engage said connecting member and simultaneously starting said timed positive lock release mechanism on its timed operation.

2. In combination, a parachute, a load package, and a quick release device imposed between said parachute and said load package; said release device comprising, a housing, a movable element on said housing designed to be secured to a parachute, a means for limiting the movement of said movable member relative to said housing, a hinged retaining arm on said housing designed to be capable of holding a load package when in the effective position of its movement, a trigger slidably mounted in said housing capable of retaining said arm in the effective position of its movement when in a forward position of its sliding movement, a spring means for yieldingly holding said trigger away from its forward position, a spring loaded hydraulic time means capable of holding said trigger in a forward position of its movement when in an effective cocked condition, and a second trigger means secured to said first mentioned movable element capable of operatively engaging said hydraulic time means and holding the same in a cocked condition when in a rear position of its movement relative to said housing; said parts so arranged relative to each other that a pulling force between the parachute and load package will move the said first moveable means, which will release the hydraulic time means, which will release the first mentioned trigger to a condition capable of disengagement with said arm when the weight package ceases to exert a load on said arm.

3. In combination, a parachute, a load package, and a quick release device imposed between said parachute and said load package; said release device comprising, a housing, a movable element on said housing designed to be secured to a parachute, a means for limiting the movement of said movable member relative to said housing, a hinged retaining arm on said housing designed to be capable of holding a load package when in the effective position of its movement, a trigger slidably mounted in said housing capable of retaining said arm in the effective position of its movement when in a forward position of its sliding movement, a spring means for yieldingly holding said trigger away from its forward position, an adjustable spring loaded hydraulic time means capable of holding said trigger in a forward position of its movement when in an effective cocked condition, and a second trigger means secured to said first mentioned moveable element capable of operatively engaging said adjustable hydraulic time means and holding the same in a cocked condition when in a rear position of its movement relative to said housing; said parts so arranged relative to each other that a pulling force between the parachute and load package will move the said first moveable means, which will release the adjustable hydraulic time means, which will release the first mentioned trigger to a condition capable of disengagement with said arm when the weight package ceases to exert a load on said arm.

4. In a quick release coupling device for connecting loads to parachutes, said coupling of the type in which the shock applied by the opening of the parachute is used to trigger off a timed release mechanism for a positive locking structure for the load latch, a trigger structure for said timed release mechanism comprising, a slide way formed in said coupling, a pierced element slidably mounted in said slide way; said coupling having an elongated hole therein registering with said slide-way; the hole of said pierced element being smaller than said elongated hole, and means secured to said sliding element and said coupling adjacent said sliding way for yielding resisting relative movement therebetween.

5. In a quick release coupling device for connecting loads to parachutes, said coupling of the type in which the shock applied by the opening of the parachute is used to trigger off a timed release mechanism for a positive locking structure for the load latch, a trigger structure for said timed release mechanism comprising, a trigger element moveably secured to said coupling; said trigger element having a hole therein; said coupling having a hole therein for securing a parachute thereto and registering partially with the hole in said trigger element, and means secured to said trigger element and engaging said timed release mechanism at times to operatively associate said release mechanism and said trigger element; whereby a single securing means for a parachute when inserted through the hole in said coupling also is automatically inserted through said trigger element hole.

FRED W. SCHLACHTER.

References Cited in the file of this patent

UNITED STATES PATENTS

| Number | Name | Date |
|---|---|---|
| 2,421,152 | Jones | May 27, 1947 |
| 2,422,839 | Maskey | June 24, 1947 |

FOREIGN PATENTS

| Number | Country | Date |
|---|---|---|
| 143,348 | Great Britain | May 27, 1920 |
| 599,461 | Great Britain | Mar. 12, 1948 |